United States Patent [19]

Mohr et al.

[11] Patent Number: 5,348,560
[45] Date of Patent: Sep. 20, 1994

[54] CARBAMATES, THEIR PREPARATION AND FUELS AND LUBRICANTS CONTAINING THE CARBAMATES

[75] Inventors: Juergen Mohr, Gruenstadt; Knut Oppenlaender; Wolf-Dieter Balzer, both of Ludwigshafen; Juergen Thomas, Fussgoenheim; Peter Schreyer, Weinheim, all of Fed. Rep. of Germany

[73] Assignee: BASF Aktiengesellschaft, Ludwigshafen, Fed. Rep. of Germany

[21] Appl. No.: 975,732

[22] Filed: Nov. 13, 1992

[30] Foreign Application Priority Data

Nov. 16, 1991 [DE] Fed. Rep. of Germany ....... 4137852

[51] Int. Cl.$^5$ ................................................. C10L 1/10
[52] U.S. Cl. .................................... 44/387; 560/166
[58] Field of Search ............................ 44/387; 560/166

[56] References Cited

U.S. PATENT DOCUMENTS

| 3,076,007 | 1/1963 | Barclay et al. | 560/345 |
|---|---|---|---|
| 3,449,406 | 6/1969 | Goodman | 560/166 |
| 3,813,341 | 5/1974 | Elliott et al. | 560/166 |
| 4,236,020 | 11/1980 | Lewis et al. | 44/387 |
| 4,322,305 | 3/1982 | Lewis | 252/51.5 |
| 4,680,129 | 7/1987 | Plavac | 252/51.5 |
| 4,832,702 | 5/1989 | Kummer et al. | 44/412 |
| 4,936,868 | 6/1990 | Johnson | 44/387 |
| 5,112,364 | 5/1992 | Rath et al. | 44/418 |

FOREIGN PATENT DOCUMENTS

244616 3/1987 European Pat. Off. .

*Primary Examiner*—John Niebling
*Assistant Examiner*—Edna Wong
*Attorney, Agent, or Firm*—Keil & Weinkauf

[57] ABSTRACT

Carbamates having a long-chain N-alkyl radical, a process for the preparation of the carbamates in a conventional manner and fuels and lubricants which contain these carbamates as additives.

5 Claims, No Drawings

CARBAMATES, THEIR PREPARATION AND FUELS AND LUBRICANTS CONTAINING THE CARBAMATES

The present invention relates to carbamates having a long-chain N-alkyl radical, a process for the preparation of the carbamates in a conventional manner and fuels and lubricants which contain these carbamates as additives.

The carburetor and intake system of gasoline engines as well as injection systems for fuel metering in gasoline and diesel engines are being increasingly contaminated by dust particles from the air, uncombusted hydrocarbon residues from the combustion chamber and the crankcase vent gases passed into the carburetor.

These residues alter the air/fuel ratio during idling and in the lower underload range so that the mixture becomes richer, the combustion more incomplete and once again the proportions of uncombusted or partially combusted hydrocarbons in the exhaust gas become greater and the gasoline consumption increases.

It is known that, to avoid these disadvantages, fuel additives are used for keeping valves and carburetors or injection systems clean (cf. for example M. Rossenbeck in Katalysatoren, Tenside, Mineralöl -additive, Editors J. Falbe, U. Hasserodt, page 223 et seq., G. Thieme Verlag, Stuttgart 1978).

A distinction is now made between two generations, according to the mode of action as well as the preferred site of action of such detergent additives.

The first generation of additives could only prevent the formation of deposits in the intake system but could not remove existing deposits in the intake system, whereas the modern additives of the second generation can do both (keep-clean and clean-up effect), owing to the changed thermal properties, in particular in zones of high temperatures, i.e. at the intake valves.

EP 414 963 A1 describes carbamates which are used as fuel additives. These carbamates are prepared in particular from halogen-containing starting materials, and the carbamate nitrogen has not only a polyolefin substituent but also a further hydrocarbon radical. The known additives are intended to prevent the formation of deposits in the combustion chamber but the impurities described above in valves and intake system are not mentioned.

Moreover, the effect of fuel additives which enter the lubricant circulation of an engine in a small amount but continuously via the combustion chamber on the lubricant still remains unclear.

Once they have entered the lubricant, on no account must such additives have an adverse effect on its properties and function. The effect of the fuel additives is therefore also considered in particular with regard to the formulation and dispersing of the oil sludge. However, most of the known detergents behave neutral to oil sludge.

If it is also desired to achieve a positive effect of the fuel or of the active ingredient present therein on the lubricant, it is useful also to add dispersing substances to the fuel.

Substances which simultaneously combine the properties of both detergents and dispersants would be ideal in this connection and of particular technical interest.

It is an object of the present invention to provide substances which, as additives in fuels, have an oil sludge-dispersing effect in addition to their positive effect in the intake system of a gasoline engine. Such substances would also be advantageous as lubricant additives.

We have found that this object is achieved by carbamates of the following general formula I

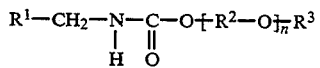    I where $R^1$ is a polybutyl or polyisobutyl radical derived from isobutene and from 0 to 30% by weight of n-butene and having a molecular weight of from 250 to 5,000, $R^2$ straight-chain or branched $C_2$-$C_6$-alkylene and $R^3$ is either hydrogen, n being 1-4, or $C_1$-$C_6$-alkyl, n being 0-4.

We have found, surprisingly, that the novel carbamates of polyisobutylamines, in addition to their valve-cleaning effect, have an advantageous effect on the sludge-carrying capacity of engine oils containing a small amount of additives or no additives at all.

The present invention therefore also relates to fuels and lubricants which contain the novel carbamates as additives.

Preferred carbamates are those in which $R^2$ is of the following formula II

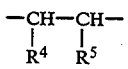    II where $R^4$ and/or $R^5$ are hydrogen, methyl or ethyl, $R^3$ is hydrogen and n is 1, and those in which $R^1$ is a polyisobutyl radical having a molecular weight of from 500 to 2,000.

If the carbamates are used in the fuels, they are preferably added in an amount of from 10 to 5,000 ppm, in particular from 50 to 1,000 ppm. Lubricants must as a rule contain larger amounts of additives, and the amounts here can be from 0.1 to 6, in particular from 0.5 to 5, % by weight.

If it is intended primarily to utilize the dispersant properties of the carbamates, they may also be combined with conventional detergents as additional additives.

In principle, any of the known products suitable for this purpose can be used as the detergent component in the mixture with the novel dispersant, as described in, for example, J. Falbe, U. Hasserodt, Katalysatoren, Tenside und Mineralöl additive, G. Thieme Verlag Stuttgart 1978, page 221 et seq. or K. Owen, Gasoline and Diesel Fuel Additives, John Wiley & Sons 1989, page 23 et seq.

N-containing detergents, for example compounds which contain an amino or amido group, are preferably used. Polybutylamines according to European Patent 0,244,616, ethylenediaminetetraacetamides and/or -imides according to European Patent 0,188,786 or polyetheramines according to European Patent 0,356,725 are particularly suitable, reference being made to the definitions in these publications. As a result of their preparation, the products described there have the additional advantage of being virtually chlorine-free and chloride-free.

The stated detergents generally have excellent efficiency in keeping valves and carburetor clean but, as mentioned above, behave neutrally to, i.e. have no adverse effect on, an engine lubricant and thus have no positive effect with regard to the desired sludge dispersing.

The present invention furthermore relates to a process for the preparation of carbamates of the formula I, wherein an amine of the general formula III

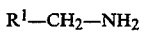  III where $R^1$ has the abovementioned meanings, is reacted with an activated carbonic acid derivative of the general formula IV in equimolar amounts

  IV where X and Y independently of one another are each chlorine or

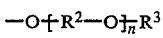  V and $R^2$ and $R^3$ have the meanings stated in claim 1, with the proviso that X and Y together may form a carbocyclic ring so that a compound of the following formula IVa results:

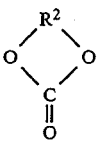  IVa where $R^2$ is of the formula II, and, where X and Y are each Cl, the product resulting from the reaction of III and IV is furthermore reacted with an alcohol of the formula VI

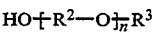  VI where $R^2$ $R^3$ and n have the meanings stated in claim 1.

For the preparation of the carbamates of the formula I, polyisobutylamines of the formula III preferably obtained by hydroformylation and subsequent reductive amination of reactive polyisobutenes according to EP-A2-0 244 616, which is herewith incorporated by reference, are reacted with the carbonic acid derivative of the formula IV by a conventional method. The reaction can be carried out, for example, in a hydrocarbon as a reaction medium at elevated temperatures. Cl-free carbonic acid derivatives are preferably used.

The polyisobutene used has a molecular weight of from 250 to 5,000, preferably from 500 to 2,000. It is obtained by cationic polymerization of isobutene by a known method, a reactive double bond which can be used for further functionalization remaining in the monomer last incorporated, after termination of the polymer chain.

Preferably used carbonic acid derivatives are the esters thereof. The cyclic esters of glycols, such as ethylene glycol, propylene glycol or butylene glycol, which gives the particular carbamates with the glycols as alcohol components after reaction with the amines, have once again proven particularly suitable.

The synthesis of carbamates by aminolysis of carbonic esters is known in principle and is described in, for example, Houben-Weyl, Methoden der Organischen Chemie, Volume E 4, Kohlensäure-Derivate, G. Thieme Verlag Stuttgart 1983, page 159 et seq.; it can be carried out in general using primary or secondary amines.

In this connection, Houben-Weyl, loc. cit., mentions U.S. Pat. No. 3,076,007, which discloses carbamates which, however, have a completely different radical R on the nitrogen and are intended for the production of isocyanate.

Leaded and unleaded regular and premium grade gasoline are suitable as fuels for gasoline engines. The gasolines may also contain components other than hydrocarbons, for example alcohols, such as methanol, ethanol or tert-butanol, and ethers, e.g. methyl tert-butyl ether. In addition to the alkoxylated polyisobutylamines to be used according to the invention, the fuels contain, as a rule, further additives, such as corrosion inhibitors, stabilizers, antioxidants and/or further detergents.

Corrosion inhibitors are generally ammonium salts of organic carboxylic acids which, owing to an appropriate structure of the starting compound, tend to form films. Amines for increasing the pH are also frequently present in corrosion inhibitors. Heterocyclic aromatics are generally used for corrosion protection of nonferrous metals.

Testing of the products for their suitability as fuel additives was carried out by means of an engine test:

The effect as a valve cleaner was tested according to CEC-F-02-T-79.

Their suitability as dispersants for dirt particles in the engine oil was determined according to the DKA proposal in a Daimler-Benz M 102 E engine.

EXAMPLES

1.1. Preparation Example for a carbamate 300 g of a polyisobutylamine (about 0.3 mol) were prepared according to DE-A1-3 611 230 from a polyisobutene having an average molecular weight of about 1,000, were initially taken in 300 ml of isododecane together with 26 g of ethylene carbonate, and mixing was carried out. The mixture was heated for from 0.5 to 1 hour at 140° C., after which the reaction was virtually complete.

The end product, a glycol carbamate, showed adsorption bands at 1680 to 1730 cm$^{-1}$ for C=O and at 3300 to 3400 cm$^{-1}$ for OH in the IR spectrum.

1.2 Results of the engine test

1.2.1 Test as valve cleaner

| Product | Deposits [mg]* Valve No. | | | |
|---|---|---|---|---|
| | 1 | 2 | 3 | 4 |
| Polyisobutylamine according to German Laid-Open Application DOS 3,611,230 | 1 | 0 | 0 | 2 |
| Example 1.1 | 0 | 0 | 0 | 1 |

*According to CEC-F-02-T-79

1.2.2 Testing of the dispersant effect in Daimler Benz M 102 E

A DKA batch 4/4 was used as the test fuel. The engine oil used was the reference oil RL 140.

Test runs were carried out using gasoline without additives (basic value) as well as with 250 ppm of test substance and, as a comparison, with 250 ppm of polyisobutylamine.

After the end of the test runs, the engine was dismantled and was allowed to drip off for 24 hours, after which a rating was carried out. The rating of the visual appearance of the individual engine parts for the carbamate from 1.1. used as an additive according to the DKA method is shown in the Table below:

| Engine part | Basic value | Rating (Scale 1-10) | |
|---|---|---|---|
| | | Addition of 250 ppm of carbamate | Addition of 250 ppm of polyisobutylamine |
| Cylinder headcover | 8.8 | 9.3 | 8.9 |
| Oil distribution pipe | 8.9 | 9.3 | 8.5 |
| Cylinder head | 8.3 | 9.2 | 8.5 |
| Oil sump | 8.2 | 9.3 | 8.9 |
| Steering case cover | 9.0 | 9.2 | 8.6 |
| Mean value | 8.6 | 9.3 | 8.7 |

The Table shows the advantageous effect of the carbamates to be used according to the invention in comparison with the starting polyisobutylamine. Owing to the dispersant properties of the carbamate, it is possible to increase the mean value of the rating of the individual engine parts from 8.6 to 9.3 (max. 10 ). The use of polyisobutylamine, on the other hand, leads to no substantial improvement compared with the basic value.

The novel carbamates thus not only prevent the formation of deposits in the carburetor and intake system but also have an oil sludge-dispersing effect.

We claim:

1. A carbamate of the following formula I

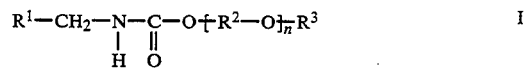

where $R^1$ is a polybutyl or polyisobutyl radical derived from isobutene and from 0 to 30% by weight of n-butene and having a molecular weight of from 250 to 5,000 $R^2$ is of the following formula II

where $R^4$ and $R^5$ are independently hydrogen, methyl or ethyl, $R^3$ is hydrogen and n is 1.

2. A carbamate as claimed in claim 1, wherein $R^1$ is a polyisobutyl radical having a molecular weight of from 500 to 2,000.

3. A liquid fuel mixture, which contains a carbamate of the formula I as claimed in claim 1.

4. A liquid fuel mixture as claimed in claim 3, which contains from 10 to 5,000 ppm of a carbamate of the formula I.

5. A liquid fuel mixture as claimed in claim 3, which, in addition to a carbamate of the formula I, contains a fuel detergent as an additional additive.

* * * * *